P. HARPER.
UNLOCKING MEMBER FOR NUT LOCKS.
APPLICATION FILED MAY 5, 1914.
1,122,112.  Patented Dec. 22, 1914.
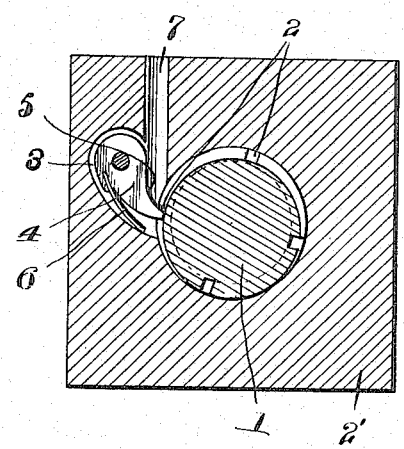
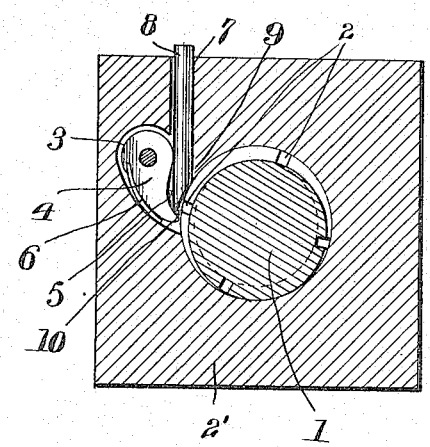
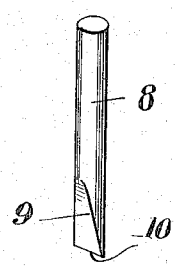
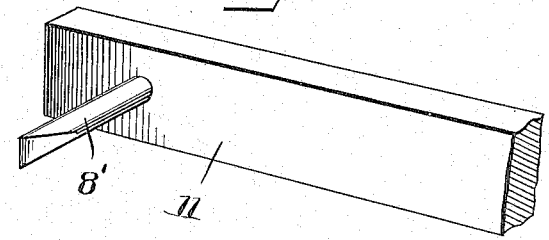
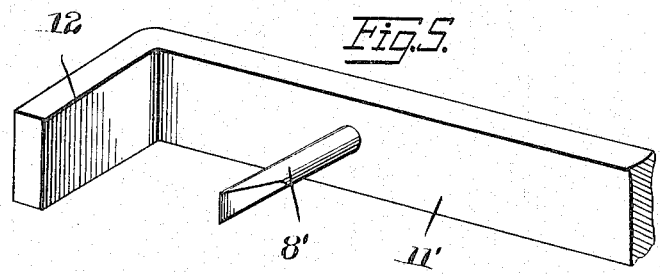
Witnesses
Frederick W. Ely.
Wm. T. Werth.
Inventor
Perry Harper,
By Victor J. Evans
Attorney

UNITED STATES PATENT OFFICE.

PERRY HARPER, OF CHARLESTON, WEST VIRGINIA.

UNLOCKING MEMBER FOR NUT-LOCKS.

1,122,112. Specification of Letters Patent. Patented Dec. 22, 1914.

Application filed May 5, 1914. Serial No. 836,526.

*To all whom it may concern:*

Be it known that I, PERRY HARPER, a citizen of the United States, residing at Charleston, in the county of Kanawha and State of West Virginia, have invented new and useful Improvements in Unlocking Members for Nut-Locks, of which the following is a specification.

The present invention relates to an improvement in an unlocking member for nut locks, and particularly to means for actuating a spring pressed dog carried by a nut which engages a groove in the shank of the bolt, whereby the said dog will be forced out of such engagement to permit of the separation of the nut from the bolt.

The object of the invention is to provide a dog actuating member which will be simple, easy to apply, sure and certain in its operation.

With the above and other objects in view, the improvement resides in the construction, combination and arrangement of parts set forth in the following specification and falling within the scope of the appended claims.

In the drawing: Figure 1 is a transverse sectional view through a nut and bolt illustrating the spring actuated dog engaging with one of a series of grooves provided in the bolt, Fig. 2 is a similar view illustrating my improved unlocking member passed within the opening in the nut and forced by the threads of the bolt into engagement with the pawl to swing the tooth of the same out of one of the grooves of the bolt to permit of the separation of the nut from the bolt, Fig. 3 is a detail perspective view of the dog actuating member, Fig. 4 is a similar perspective view illustrating the same forming a part of a wrench, and Fig. 5 is a similar view illustrating another form of wrench provided with the improvement.

Referring now to the drawings in detail, the numeral 1 designates a bolt which has its shank provided with a plurality of longitudinally extending grooves 2.

The numeral 2' designates a nut which is adapted to be threaded upon the bolt. The nut, approximately central of its core, is formed with a depression 3 within which is pivotally secured a dog 4 which has a rounded end at its engaging portion or working face 5, and the said pointed engaging face is normally forced into the bore of the nut by a spring 6 which is connected with the dog and which contacts with one of the walls of the depression 3. The nut is provided with an opening 7 which enters the depression 3 and which is arranged within the path of the curved face of the dog provided with the pointed engaging end or tooth 5.

The numeral 8 designates my improved dog actuating member which, in one form, is illustrated in the nature of a pin, having one of its faces inclined or curved, as at 9, to provide the same with a pointed end 10. The member 8 is adapted to be inserted through the opening 7 to bring its pointed end 10 into contact with the rounded face of the dog adjacent its tooth 5 and to also have its inclined or rounded portion 9 contact with the threaded shank of the bolt, whereby the said shank will provide a fulcrum or directing member for the pin 8 so that a further inward pressure will cause the tooth 5 to be retracted from engagement with one of the grooves 2 of the bolt 1.

In Fig. 4 the pin 8' is illustrated as connected with or integrally formed with a flat bar 11, the said bar adapted to contact with one of the flat faces of the nut to permit of the insertion of the pin 8' through the opening 7, and the pin contacting with one of the walls of the opening 7 and the member 11 contacting with the outer face of the nut will readily permit of the turning of the same to permit of the nut being removed from the bolt.

In Fig. 5 the pin 8' is connected with a bar 11' similar to the bar 11, but in this instance the bar is provided with an annular offset member or flange 12 which is arranged a distance away from the pin equaling the distance between the opening and the face of the nut arranged parallel with the said opening. With this construction the pin 8' the bar 11, forward of the flange 12, and the said flange 12 all engage with the nut, to insure the ready removal of the nut from the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In a device for the purpose set forth, a pin having a tapered and inclined face providing the same with a sharpened end, and a flat rectangular member connected with the pin.

2. In a device for the purpose set forth, a pin having a side beveled toward its ends, a rectangular member connecting the pin, and said member having a flange arranged in the direction of the pin but spaced away from the said pin.

In testimony whereof I affix my signature in presence of two witnesses.

PERRY HARPER.

Witnesses:
G. T. PRICE,
ALBERT SMITH.